US012639617B2

(12) United States Patent
Batta et al.

(10) Patent No.: US 12,639,617 B2
(45) Date of Patent: May 26, 2026

(54) RISK ASSESSMENT OF A PROPOSED CHANGE IN A COMPUTING ENVIRONMENT

(71) Applicant: International Business Machines Corporation, Armonk, NY (US)

(72) Inventors: Raghav Batta, Ossining, NY (US); Michael Elton Nidd, Zurich (CH); Larisa Shwartz, Greenwich, CT (US); Jinho Hwang, Ossining, NY (US); Harshit Kumar, Delhi (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1143 days.

(21) Appl. No.: 17/150,657

(22) Filed: Jan. 15, 2021

(65) Prior Publication Data

US 2022/0230090 A1 Jul. 21, 2022

(51) Int. Cl.
| | |
|---|---|
| *G06N 20/00* | (2019.01) |
| *G06F 16/23* | (2019.01) |
| *G06Q 10/0635* | (2023.01) |

(52) U.S. Cl.
CPC ......... *G06N 20/00* (2019.01); *G06F 16/2358* (2019.01); *G06Q 10/0635* (2013.01)

(58) Field of Classification Search
CPC . G06N 20/00; G06F 16/2358; G06Q 10/0635
See application file for complete search history.

(56) References Cited

U.S. PATENT DOCUMENTS

| | | | |
|---|---|---|---|
| 9,323,641 | B2 | 4/2016 | Beasley |
| 9,448,787 | B2 | 9/2016 | Rosomoff |
| 9,449,344 | B2 | 9/2016 | Deshpande et al. |
| 11,188,447 | B2 | 11/2021 | Kalia et al. |
| 11,221,908 | B1 | 1/2022 | Batta et al. |
| 2017/0178038 | A1 | 6/2017 | Guven et al. |
| 2018/0248895 | A1* | 8/2018 | Watson ................ H04L 63/083 |
| 2020/0067798 | A1 | 2/2020 | Kalia et al. |

(Continued)

OTHER PUBLICATIONS

Chen, Ting, et al. "Big Self-Supervised Models are Strong Semi-Supervised Learners." arXiv preprint arXiv:2006.10029 (2020). https://arxiv.org/pdf/2006.10029 (Year: 2020).*

(Continued)

*Primary Examiner* — Michael H Hoang
(74) *Attorney, Agent, or Firm* — Amin, Turocy & Watson, LLP

(57) ABSTRACT

Systems, computer-implemented methods, and computer program products to facilitate proactive operational risk assessment of a proposed change in a computing environment are provided. According to an embodiment, a system can comprise a processor that executes computer executable components stored in memory. The computer executable components can comprise an extraction component that identifies change events in historic operational data that induced one or more incidents in a computing environment. The computer executable components further comprise an assessment component that employs a model to assign a change risk assessment score to a defined change in the computing environment based on the change events.

21 Claims, 10 Drawing Sheets

(56)         References Cited

U.S. PATENT DOCUMENTS

2020/0410001 A1 * 12/2020 Sarkissian ............. G06F 3/0482

OTHER PUBLICATIONS

Jaderberg, Max, et al. "Population based training of neural networks." arXiv preprint arXiv:1711.09846 (2017). https://arxiv.org/abs/1711.09846 (Year: 2017).*

Wan, Yao, et al. "Improving automatic source code summarization via deep reinforcement learning." Proceedings of the 33rd ACM/IEEE international conference on automated software engineering. 2018. https://dl.acm.org/doi/pdf/10.1145/3238147.3238206 (Year: 2018).*

Fang, Fan, et al. "Better model selection with a new definition of feature importance." arXiv preprint arXiv:2009.07708 (2020). https://arxiv.org/pdf/2009.07708 (Year: 2020).*

Mell et al., "The NIST Definition of Cloud Computing," Recommendations of the National Institute of Standards and Technology, NIST Special Publication 800-145, Sep. 2011, 7 pages.

Tripathy, "Risk Assessment in IT Infrastructure," Ethics, Laws, and Policies for Privacy, Security, and Liability, IntechOpen, 2020, 14 pages.

"How to Assess the Risk of a Change with 5 Simple Questions," Joe the IT Guy, https://www.joetheitguy.com/how-to-assess-the-risk-of-a-change-with-5-simple-questions/, Dec. 5, 2018, 10 pages.

Williams et al., "Change Risk Assessment: Understanding Risks Involved in Changing Software Requirements," International Conference on Software Engineering Research and Practice, 2006, 7 pages.

Guven et al., "Coach: Cognitive analytics for change," IFIP/IEEE Symposium on Integrated Network and Service Management, 2017, 7 pages.

Foley Joe. "Mastering Change with Machine Learning", Numerify, Feb. 22, 2018, 7 pages.

* cited by examiner

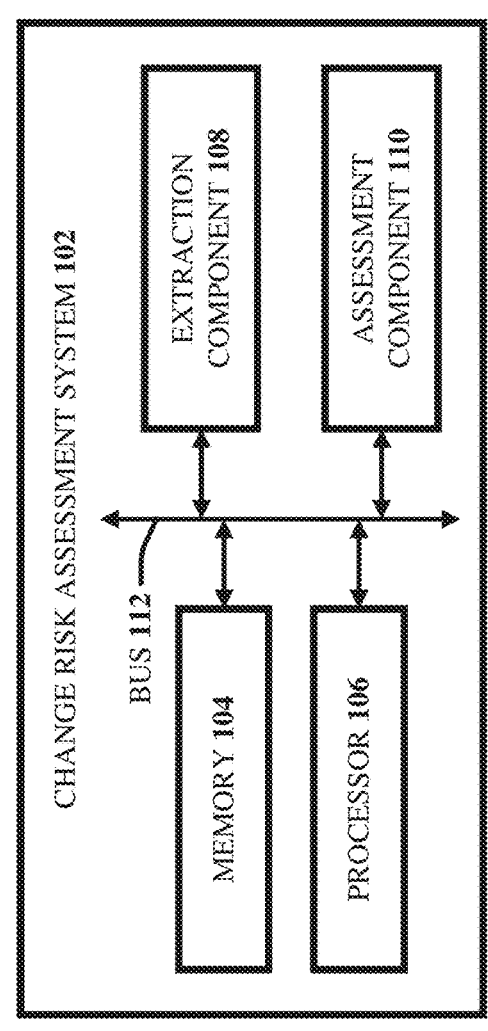
FIG. 1

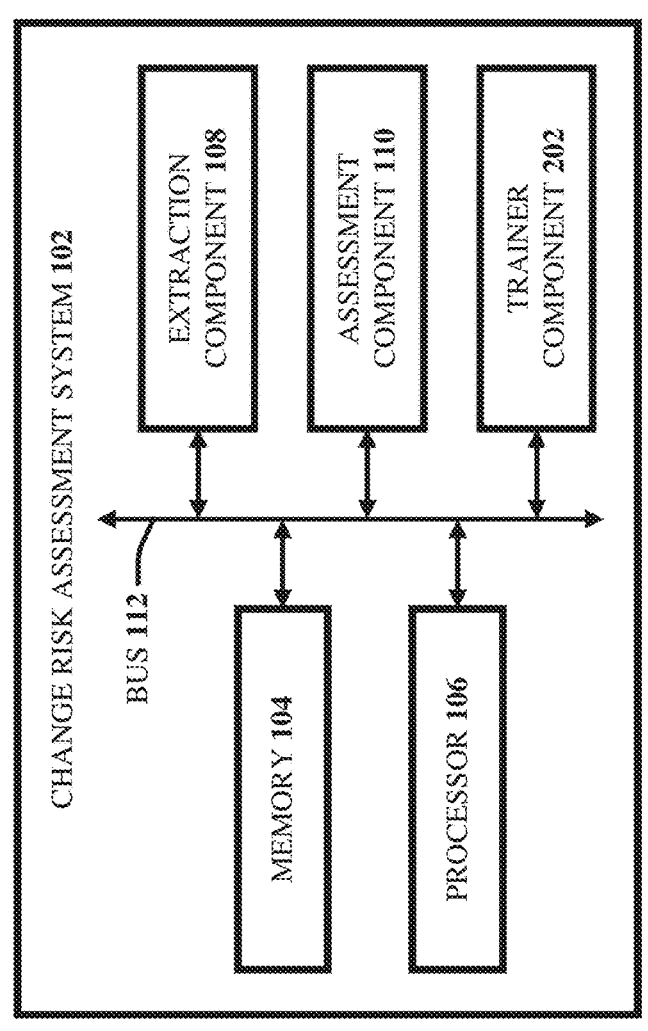
FIG. 2

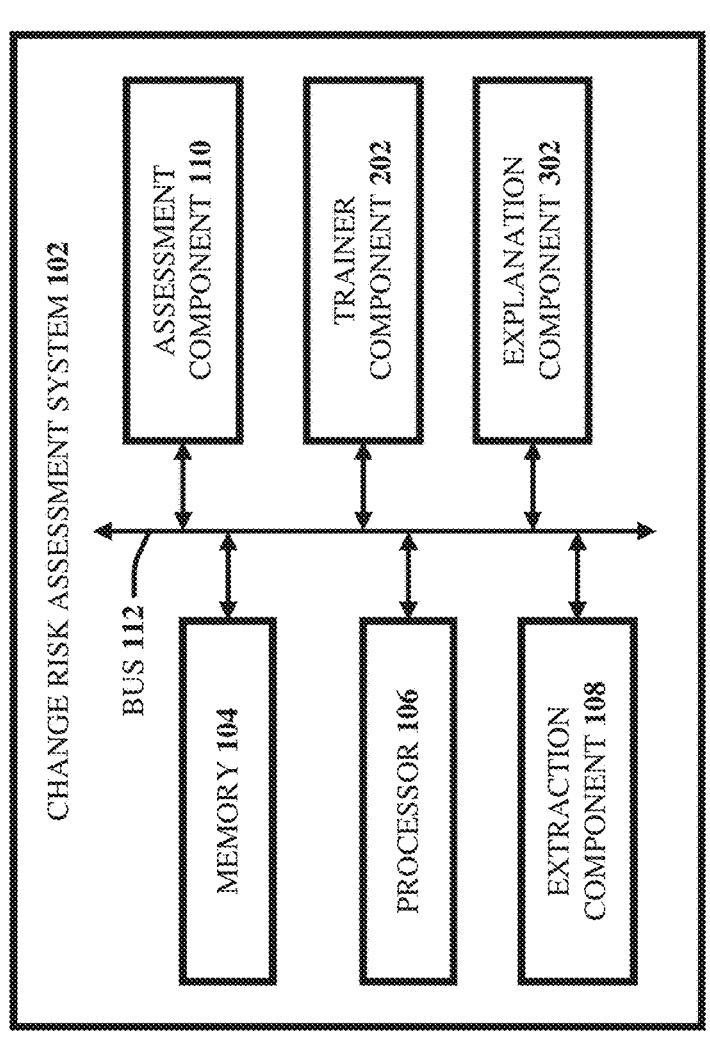
FIG. 3

602 — IDENTIFYING, BY A SYSTEM OPERATIVELY COUPLED TO A PROCESSOR, CHANGE EVENTS IN HISTORIC OPERATIONAL DATA THAT INDUCED ONE OR MORE INCIDENTS IN A COMPUTING ENVIRONMENT

604 — EMPLOYING, BY THE SYSTEM, A MODEL TO ASSIGN A CHANGE RISK ASSESSMENT SCORE TO A DEFINED CHANGE IN THE COMPUTING ENVIRONMENT BASED ON THE CHANGE EVENTS.

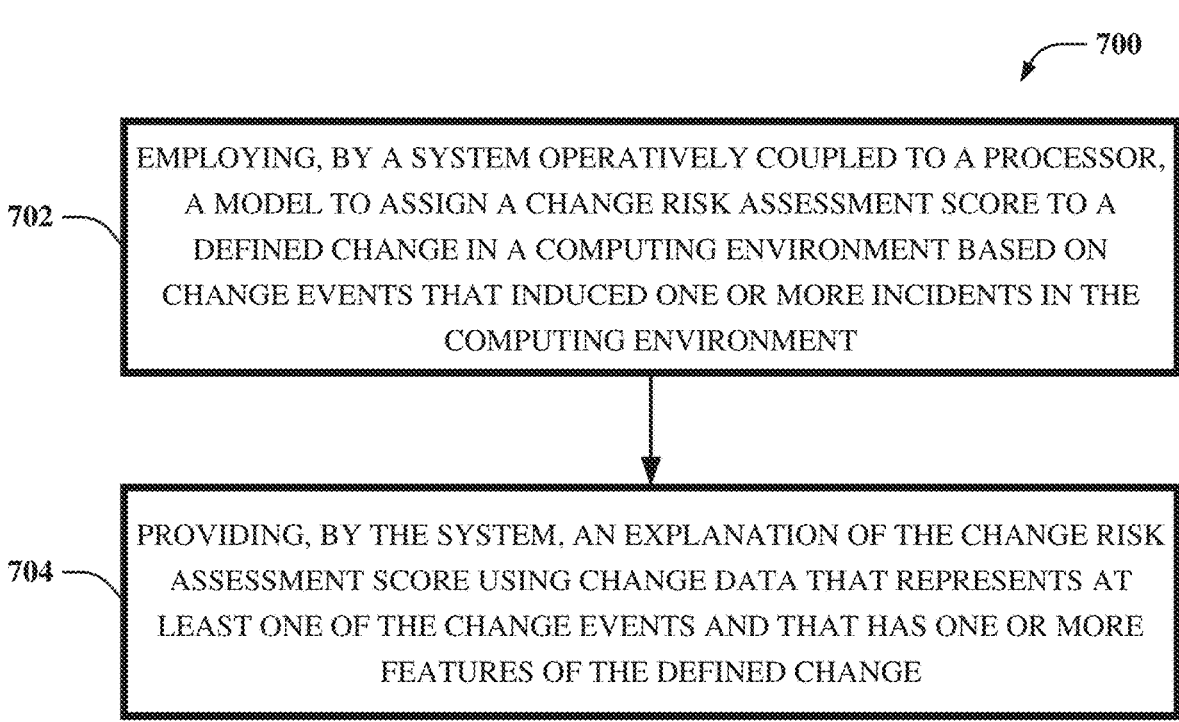

702 — EMPLOYING, BY A SYSTEM OPERATIVELY COUPLED TO A PROCESSOR, A MODEL TO ASSIGN A CHANGE RISK ASSESSMENT SCORE TO A DEFINED CHANGE IN A COMPUTING ENVIRONMENT BASED ON CHANGE EVENTS THAT INDUCED ONE OR MORE INCIDENTS IN THE COMPUTING ENVIRONMENT

704 — PROVIDING, BY THE SYSTEM, AN EXPLANATION OF THE CHANGE RISK ASSESSMENT SCORE USING CHANGE DATA THAT REPRESENTS AT LEAST ONE OF THE CHANGE EVENTS AND THAT HAS ONE OR MORE FEATURES OF THE DEFINED CHANGE

RISK ASSESSMENT OF A PROPOSED CHANGE IN A COMPUTING ENVIRONMENT

BACKGROUND

The subject disclosure relates to operational risk assessment of a computing environment, and more specifically, to proactive operational risk assessment of a proposed change in a computing environment.

Open systems such as, for example, those in natural sciences, computer science, ecology, engineering, management, and/or another domain, are highly dependent on the environment. Changes to the environment affect the open system as much as changes in the system itself. An application, for instance, is an open system with interactions and dependencies on one or more resources and/or processes of a computing environment.

A large proportion of incidents in a system are caused by changes including, for example, source code changes, configuration changes, environment changes, outdated security changes, and/or another change. In many systems: changes that are closed as successful can lead to incidents; changes that cause one incident can go on to cause one or more other incidents; and/or a significant percentage of incidents can be directly linked to a recent change.

A problem with current risk assessment technologies is that they do not proactively assess risk associated with a proposed change. Another problem with such risk assessment technologies is that they do not provide an explanation of the risk associated with the proposed change.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, and/or computer program products that facilitate proactive operational risk assessment of a proposed change in a computing environment are described.

According to an embodiment, a system can comprise a processor that executes computer executable components stored in memory. The computer executable components can comprise an extraction component that identifies change events in historic operational data that induced one or more incidents in a computing environment. The computer executable components further comprise an assessment component that employs a model to assign a change risk assessment score to a defined change in the computing environment based on the change events. An advantage of such a system is that it can provide a proactive operational risk assessment of a proposed change in a computing environment and an explanation of the assessment, where such an assessment and/or explanation can enable an entity to reduce operational risk of one or more computing resources in the computing environment.

In some embodiments, the computer executable components can further comprise an explanation component that identifies features in change data representing the defined change and further identifies the features in change events data representing the change events to explain the change risk assessment score. An advantage of such a system is that it can provide a proactive operational risk assessment of a proposed change in a computing environment and an explanation of the assessment, where such an assessment and/or explanation can enable an entity to reduce operational risk of one or more computing resources in the computing environment.

According to another embodiment, a computer-implemented method can comprise identifying, by a system operatively coupled to a processor, change events in historic operational data that induced one or more incidents in a computing environment. The computer-implemented method can further comprise employing, by the system, a model to assign a change risk assessment score to a defined change in the computing environment based on the change events. An advantage of such a computer-implemented method is that it can be implemented to provide a proactive operational risk assessment of a proposed change in a computing environment and an explanation of the assessment, where such an assessment and/or explanation can enable an entity to reduce operational risk of one or more computing resources in the computing environment.

In some embodiments, the computer-implemented method can further comprise identifying, by the system, features in change data representing the defined change and identifying, by the system, the features in change events data representing the change events to explain the change risk assessment score. An advantage of such a computer-implemented method is that it can be implemented to provide a proactive operational risk assessment of a proposed change in a computing environment and an explanation of the assessment, where such an assessment and/or explanation can enable an entity to reduce operational risk of one or more computing resources in the computing environment.

According to another embodiment, a computer program product comprising a computer readable storage medium having program instructions embodied therewith, the program instructions executable by a processor to cause the processor to identify change events in historic operational data that induced one or more incidents in a computing environment. The program instructions are further executable by the processor to cause the processor to employ a model to assign a change risk assessment score to a defined change in the computing environment based on the change events. An advantage of such a computer program product is that it can be implemented to provide a proactive operational risk assessment of a proposed change in a computing environment and an explanation of the assessment, where such an assessment and/or explanation can enable an entity to reduce operational risk of one or more computing resources in the computing environment.

In some embodiments, the program instructions are further executable by the processor to cause the processor to identify features in change data representing the defined change and identify the features in change events data representing the change events to explain the change risk assessment score. An advantage of such a computer program product is that it can be implemented to provide a proactive operational risk assessment of a proposed change in a computing environment and an explanation of the assessment, where such an assessment and/or explanation can enable an entity to reduce operational risk of one or more computing resources in the computing environment.

According to an embodiment, a system can comprise a processor that executes computer executable components stored in memory. The computer executable components can comprise an assessment component that employs a model to assign a change risk assessment score to a defined change in a computing environment based on change events that induced one or more incidents in the computing environment. The computer executable components further comprise an explanation component that provides an explanation of the change risk assessment score using change data that represents at least one of the change events and that has one or more features of the defined change. An advantage of such a system is that it can provide a proactive operational risk assessment of a proposed change in a computing environment and an explanation of the assessment, where such an assessment and/or explanation can enable an entity to reduce operational risk of one or more computing resources in the computing environment.

In some embodiments, the assessment component employs the model to assign or alter the change risk assessment score based on feedback from an expert entity, thereby reducing false positive change risk assessment scores output by the system, improving accuracy of the change risk assessment score, or reducing operational risk associated with one or more computing resources of the computing environment. An advantage of such a system is that it can provide a proactive operational risk assessment of a proposed change in a computing environment and an explanation of the assessment, where such an assessment and/or explanation can enable an entity to reduce operational risk of one or more computing resources in the computing environment.

According to another embodiment, a computer-implemented method can comprise employing, by a system operatively coupled to a processor, a model to assign a change risk assessment score to a defined change in a computing environment based on change events that induced one or more incidents in the computing environment. The computer-implemented method can further comprise providing, by the system, an explanation of the change risk assessment score using change data that represents at least one of the change events and that has one or more features of the defined change. An advantage of such a computer-implemented method is that it can be implemented to provide a proactive operational risk assessment of a proposed change in a computing environment and an explanation of the assessment, where such an assessment and/or explanation can enable an entity to reduce operational risk of one or more computing resources in the computing environment.

In some embodiments, the computer-implemented method can further comprise employing, by the system, the model to assign or alter the change risk assessment score based on feedback from an expert entity, thereby reducing false positive change risk assessment scores output by the system, improving accuracy of the change risk assessment score, or reducing operational risk associated with one or more computing resources of the computing environment. An advantage of such a computer-implemented method is that it can be implemented to provide a proactive operational risk assessment of a proposed change in a computing environment and an explanation of the assessment, where such an assessment and/or explanation can enable an entity to reduce operational risk of one or more computing resources in the computing environment.

DESCRIPTION OF THE DRAWINGS

FIGS. 1, 2, 3, and 4 illustrate block diagrams of example, non-limiting systems that can facilitate proactive operational risk assessment of a proposed change in a computing environment in accordance with one or more embodiments described herein.

FIGS. 6 and 7 illustrate flow diagrams of example, non-limiting computer-implemented methods that can facilitate proactive operational risk assessment of a proposed change in a computing environment in accordance with one or more embodiments described herein.

DETAILED DESCRIPTION

Figure 4:
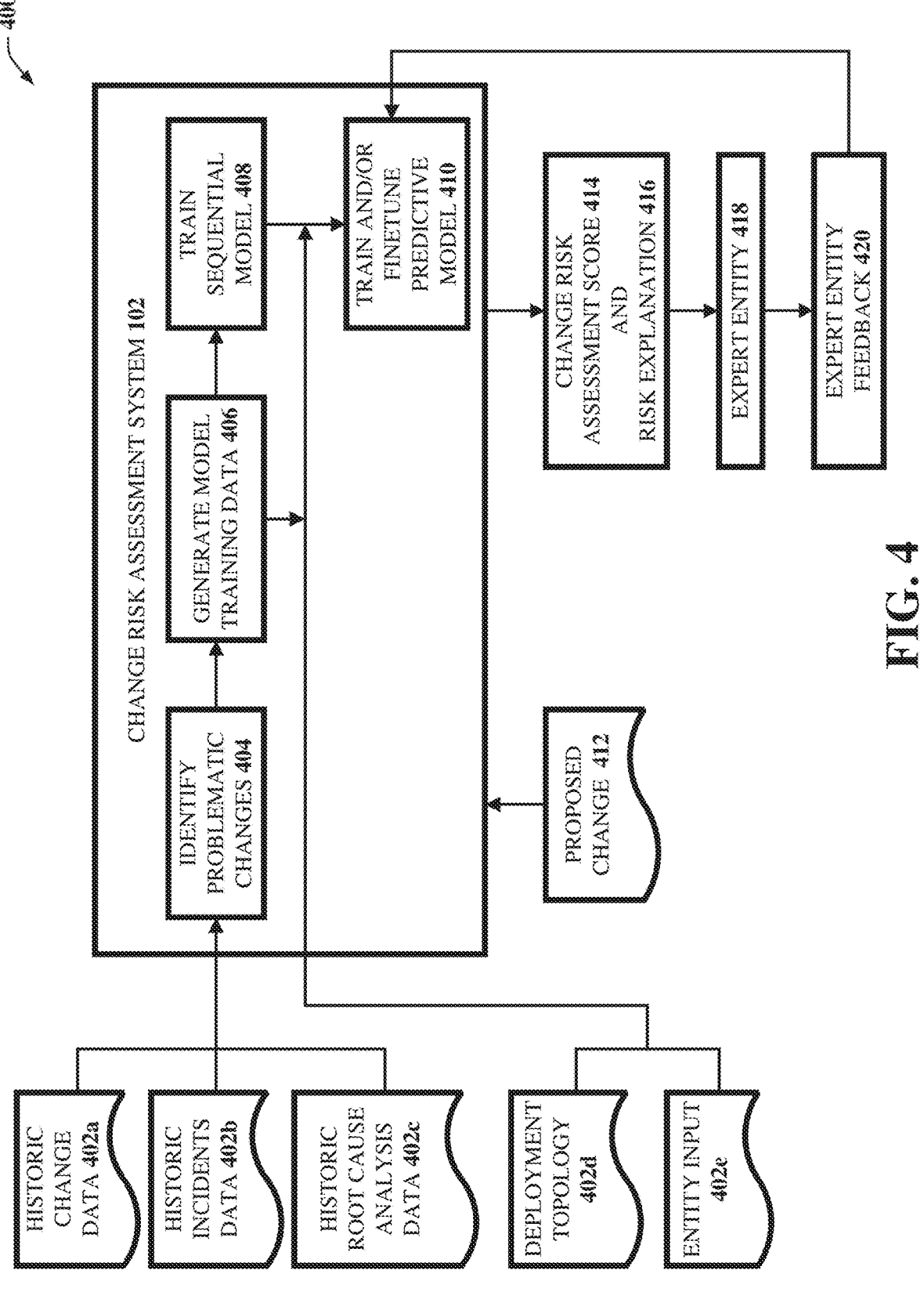

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, where like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Given the problems described above with existing risk assessment technologies, the present disclosure can be implemented to produce a solution to these problems in the form of systems, computer-implemented methods, and/or computer program products that can facilitate proactive operational risk assessment of a proposed change in a computing environment by: identifying change events in historic operational data that induced one or more incidents in a computing environment; and/or employing a model to assign a change risk assessment score to a defined change in the computing environment based on the change events. An advantage of such systems, computer-implemented methods, and/or computer program products is that they can be implemented to provide a proactive operational risk assessment of a proposed change in a computing environment and an explanation of the assessment, where such an assessment and/or explanation can enable an entity to reduce operational risk of one or more computing resources in the computing environment.

In some embodiments, the present disclosure can be implemented to produce a solution to the problems described above in the form of systems, computer-implemented methods, and/or computer program products that can further facilitate proactive operational risk assessment of a proposed change in a computing environment by: identifying features in change data representing the defined change; and identifying the features in change events data representing the change events to explain the change risk assessment score. An advantage of such systems, computer-implemented methods, and/or computer program products is that they can be implemented to provide a proactive operational risk assessment of a proposed change in a computing environment and an explanation of the assessment, where such an assessment and/or explanation can enable an entity to reduce operational risk of one or more computing resources in the computing environment.

It should be appreciated from the description below that the various embodiments of the subject disclosure can enable proactive assessment of operational risk associated with, for instance, a proposed change described in a change ticket in a computing environment. It should also be appreciated from the description below that the various embodiments of the subject disclosure can further enable providing a risk explanation with the assessment to help a site reliability engineer (SRE) prevent potential incidents and/or failures that can be caused by the proposed change, thus minimizing the overall operational risk of the computing environment. For example, it should be appreciated from the description below that the various embodiments of the subject disclosure can enable: creation of a ground truth dataset of problematic changes that induced one or more incidents in a computing environment, where such problematic changes can be identified in historic change tickets; generation of model training data using the ground truth dataset; training of a sequence model using vector representations of the model training data and deep learning approaches to generate return sequences representing hidden states corresponding to input time steps; concatenation of additional risk features (e.g., from deployment topology and/or expert entity input) to a return sequences layer of the sequence model to generate intermediate vector representations; combination of all the above information from various sources; training of a predictive model to assess operational risk associated with a proposed change described in a change ticket and provide a change risk assessment score; using model explainability techniques to derive features that explain the risk assessment and/or the risk assessment score; generation of a risk explanation using the features to extract historic evidence of problematic changes that contain the features; and/or incorporation of expert entity feedback on the change risk assessment score to finetune the feature weights of the prediction model, thus increasing the accuracy of the prediction model and/or reducing operational risk associated with one or more computing resources of the computing environment.

As referenced herein, an "entity" can comprise a human, a client, a user, a computing device, a software application, an agent, a machine learning (ML) model, an artificial intelligence (AI) model, and/or another entity. As referenced herein, an "expert entity" can comprise a human, a computing device, a software application, an expert agent, an AI model, an ML model, and/or another entity that can assess and/or verify the accuracy of the change risk assessment score referenced above.

FIGS. 1, 2, and 3 illustrate block diagrams of example, non-limiting systems 100, 200, and 300, respectively, that can each facilitate proactive operational risk assessment of a proposed change in a computing environment in accordance with one or more embodiments described herein. System 100, 200, and 300 can each comprise a change risk assessment system 102. Change risk assessment system 102 of system 100 depicted in FIG. 1 can comprise a memory 104, a processor 106, an extraction component 108, an assessment component 110, and/or a bus 112. Change risk assessment system 102 of system 200 depicted in FIG. 2 can further comprise a trainer component 202. Change risk assessment system 102 of system 300 depicted in FIG. 3 can further comprise an explanation component 302.

It should be appreciated that the embodiments of the subject disclosure depicted in various figures disclosed herein are for illustration only, and as such, the architecture of such embodiments are not limited to the systems, devices, and/or components depicted therein. For example, in some embodiments, system 100, system 200, system 300, and/or change risk assessment system 102 can further comprise various computer and/or computing-based elements described herein with reference to operating environment 800 and FIG. 8. In several embodiments, such computer and/or computing-based elements can be used in connection with implementing one or more of the systems, devices, components, and/or computer-implemented operations shown and described in connection with FIG. 1, FIG. 2, FIG. 3, and/or other figures disclosed herein.

Memory 104 can store one or more computer and/or machine readable, writable, and/or executable components and/or instructions that, when executed by processor 106 (e.g., a classical processor, a quantum processor, and/or another type of processor), can facilitate performance of operations defined by the executable component(s) and/or instruction(s). For example, memory 104 can store computer and/or machine readable, writable, and/or executable components and/or instructions that, when executed by processor 106, can facilitate execution of the various functions described herein relating to change risk assessment system 102, extraction component 108, assessment component 110, trainer component 202, explanation component 302, and/or another component associated with change risk assessment system 102 as described herein with or without reference to the various figures of the subject disclosure.

Memory 104 can comprise volatile memory (e.g., random access memory (RAM), static RAM (SRAM), dynamic RAM (DRAM), and/or another type of volatile memory) and/or non-volatile memory (e.g., read only memory (ROM), programmable ROM (PROM), electrically programmable ROM (EPROM), electrically erasable programmable ROM (EEPROM), and/or another type of non-volatile memory) that can employ one or more memory architectures. Further examples of memory 104 are described below with reference to system memory 816 and FIG. 8. Such examples of memory 104 can be employed to implement any embodiments of the subject disclosure.

Processor 106 can comprise one or more types of processors and/or electronic circuitry (e.g., a classical processor, a quantum processor, and/or another type of processor and/or electronic circuitry) that can implement one or more computer and/or machine readable, writable, and/or executable components and/or instructions that can be stored on memory 104. For example, processor 106 can perform various operations that can be specified by such computer and/or machine readable, writable, and/or executable components and/or instructions including, but not limited to, logic, control, input/output (I/O), arithmetic, and/or the like. In some embodiments, processor 106 can comprise one or more central processing unit, multi-core processor, microprocessor, dual microprocessors, microcontroller, System on a Chip (SOC), array processor, vector processor, quantum processor, and/or another type of processor. Further examples of processor 106 are described below with reference to processing unit 814 and FIG. 8. Such examples of processor 106 can be employed to implement any embodiments of the subject disclosure.

Change risk assessment system 102, memory 104, processor 106, extraction component 108, assessment component 110, trainer component 202, explanation component 302, and/or another component of change risk assessment system 102 as described herein can be communicatively, electrically, operatively, and/or optically coupled to one another via bus 112 to perform functions of system 100, system 200, system 300, change risk assessment system 102, and/or any components coupled therewith. Bus 112 can comprise one or more memory bus, memory controller, peripheral bus, external bus, local bus, a quantum bus, and/or another type of bus that can employ various bus architectures. Further examples of bus 112 are described below with reference to system bus 818 and FIG. 8. Such examples of bus 112 can be employed to implement any embodiments of the subject disclosure.

Change risk assessment system 102 can comprise any type of component, machine, device, facility, apparatus, and/or instrument that comprises a processor and/or can be capable of effective and/or operative communication with a wired and/or wireless network. All such embodiments are envisioned. For example, change risk assessment system 102 can comprise a server device, a computing device, a general-purpose computer, a special-purpose computer, a quantum computing device (e.g., a quantum computer), a tablet computing device, a handheld device, a server class computing machine and/or database, a laptop computer, a notebook computer, a desktop computer, a cell phone, a smart phone, a consumer appliance and/or instrumentation, an industrial and/or commercial device, a digital assistant, a multimedia Internet enabled phone, a multimedia players, and/or another type of device.

Change risk assessment system 102 can be coupled (e.g., communicatively, electrically, operatively, optically, and/or coupled via another type of coupling) to one or more external systems, sources, and/or devices (e.g., classical and/or quantum computing devices, communication devices, and/or another type of external system, source, and/or device) using a wire and/or a cable. For example, change risk assessment system 102 can be coupled (e.g., communicatively, electrically, operatively, optically, and/or coupled via another type of coupling) to one or more external systems, sources, and/or devices (e.g., classical and/or quantum computing devices, communication devices, and/or another type of external system, source, and/or device) using a data cable including, but not limited to, a High-Definition Multimedia Interface (HDMI) cable, a recommended standard (RS) 232 cable, an Ethernet cable, and/or another data cable.

In some embodiments, change risk assessment system 102 can be coupled (e.g., communicatively, electrically, operatively, optically, and/or coupled via another type of coupling) to one or more external systems, sources, and/or devices (e.g., classical and/or quantum computing devices, communication devices, and/or another type of external system, source, and/or device) via a network. For example, such a network can comprise wired and/or wireless networks, including, but not limited to, a cellular network, a wide area network (WAN) (e.g., the Internet) or a local area network (LAN). Change risk assessment system 102 can communicate with one or more external systems, sources, and/or devices, for instance, computing devices using virtually any desired wired and/or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and non-proprietary communication protocols. Therefore, in some embodiments, change risk assessment system 102 can comprise hardware (e.g., a central processing unit (CPU), a transceiver, a decoder, quantum hardware, a quantum processor, and/or other hardware), software (e.g., a set of threads, a set of processes, software in execution, quantum pulse schedule, quantum circuit, quantum gates, and/or other software) or a combination of hardware and software that can facilitate communicating information between change risk assessment system 102 and external systems, sources, and/or devices (e.g., computing devices, communication devices, and/or another type of external system, source, and/or device).

Change risk assessment system 102 can comprise one or more computer and/or machine readable, writable, and/or executable components and/or instructions that, when executed by processor 106 (e.g., a classical processor, a quantum processor, and/or another type of processor), can facilitate performance of operations defined by such component(s) and/or instruction(s). Further, in numerous embodiments, any component associated with change risk assessment system 102, as described herein with or without reference to the various figures of the subject disclosure, can comprise one or more computer and/or machine readable, writable, and/or executable components and/or instructions that, when executed by processor 106, can facilitate performance of operations defined by such component(s) and/or instruction(s). For example, extraction component 108, assessment component 110, trainer component 202, explanation component 302, and/or any other components associated with change risk assessment system 102 as disclosed herein (e.g., communicatively, electronically, operatively, and/or optically coupled with and/or employed by change risk assessment system 102), can comprise such computer and/or machine readable, writable, and/or executable component(s) and/or instruction(s). Consequently, according to numerous embodiments, change risk assessment system 102 and/or any components associated therewith as disclosed herein, can employ processor 106 to execute such computer and/or machine readable, writable, and/or executable component(s) and/or instruction(s) to facilitate performance of one or more operations described herein with reference to change risk assessment system 102 and/or any such components associated therewith.

Change risk assessment system 102 can facilitate (e.g., via processor 106) performance of operations executed by and/or associated with extraction component 108, assessment component 110, trainer component 202, explanation component 302, and/or another component associated with change risk assessment system 102 as disclosed herein. For example, as described in detail below, change risk assessment system 102 can facilitate (e.g., via processor 106): identifying change events in historic operational data that induced one or more incidents in a computing environment; and/or employing a model to assign a change risk assessment score to a defined change in the computing environment based on the change events.

In the above example, as described in detail below, change risk assessment system 102 can further facilitate (e.g., via processor 106): generating a vectorized model training dataset from a ground truth dataset comprising the change events and the one or more incidents and training, using the vectorized model training dataset, a sequence model to generate return sequences representing time steps corresponding to the vectorized model training dataset; combing the return sequences with risk feature data obtained from at least one of an expert entity or a deployment topology associated with the defined change or the computing environment to generate combined vector representations and training, using the combined vector representations, the model to assign the change risk assessment score to the defined change; identifying features in change data representing the defined change and identifying the features in change events data representing the change events to explain the change risk assessment score; and/or employing the model to assign or alter the change risk assessment score based on feedback from an expert entity, thereby reducing false positive change risk assessment scores output by the system, improving accuracy of the change risk assessment score, or reducing operational risk associated with one or more computing resources of the computing environment.

In another example, as described in detail below, change risk assessment system 102 can further facilitate (e.g., via processor 106): employing a model to assign a change risk assessment score to a defined change in a computing environment based on change events that induced one or more incidents in the computing environment; and/or providing an explanation of the change risk assessment score using change data that represents at least one of the change events and that has one or more features of the defined change.

In the above example, as described in detail below, change risk assessment system 102 can further facilitate (e.g., via processor 106): identifying at least one of the change events or the one or more incidents in historic operational data of the computing environment; generating a vectorized model training dataset from a ground truth dataset comprising the change events and the one or more incidents and training, using the vectorized model training dataset, a sequence model to generate return sequences representing time steps corresponding to the vectorized model training dataset; combing the return sequences with risk feature data obtained from at least one of an expert entity or a deployment topology associated with the defined change or the computing environment to generate combined vector representations and training, using the combined vector representations, the model to assign the change risk assessment score to the defined change; and/or employing the model to assign or alter the change risk assessment score based on feedback from an expert entity, thereby reducing false positive change risk assessment scores output by the system, improving accuracy of the change risk assessment score, or reducing operational risk associated with one or more computing resources of the computing environment.

Extraction component 108 can identify one or more change events in historic operational data that induced one or more incidents in a computing environment. For example, extraction component 108 can analyze historic operational data (e.g., change tickets, root cause analysis reports, incident tickets, resolution data, SRE dialogue data, logs, and/or other data) of a computing environment (e.g., a classical based, cloud based, or quantum based computing environment) to identify and/or extract change event data (e.g., text data, numeric data, alphanumeric data, and/or other data) describing change events (e.g., source code changes, configuration changes, environment changes, outdated security changes, and/or another change event) that induced one or more incidents (e.g., resource and/or service interruption, failure, delay, and/or damage) in the computing environment. In various embodiments, such historic operation data, change event data, and/or incident events data describing such one or more incidents can comprise structured and/or unstructured data.

To identify and/or extract such change event data describing change events that induced one or more incidents, extraction component 108 can employ one or more models (e.g., an ML and/or AI model) and/or techniques including, but not limited to: natural language processing (NLP), deep NLP parsing (e.g., using one or more neural networks), portable document format (PDF) parsing, text passage classifiers, entity extraction, supervised frequent pattern learning, unsupervised frequent pattern learning, semantic filtering, and/or another model and/or technique. In some embodiments, extraction component 108 can employ different information extraction techniques and/or different combinations of information techniques to extract such change event data.

Extraction component 108 can identify and/or extract, from historic operational data of a computing environment, one or more explicit change-incident linkages and/or one or more inexplicit change-incident linkage. To identify and/or extract an explicit change-incident linkage, extraction component 108 can identify and/or extract, from historic operational data of a computing environment, one or more problematic changes that induced one or more incidents in the computing environment. For example, extraction component 108 can identify and/or extract change event data (e.g., alphanumeric descriptions) from, for instance, historic change tickets and/or incident event data (e.g., alphanumeric descriptions) from, for instance, historic incident tickets and/or historic root cause analysis reports describing the incidents. In an example, extraction component 108 can identify and/or extract one or more explicit change-incident linkages by identifying and/or extracting one or more change identifiers (e.g., change number and/or change ticket number) from, for example, a historic root cause analysis record describing one or more historic incident tickets and/or such one or more change identifiers.

To identify and/or extract an inexplicit change-incident linkage, extraction component 108 can implement a semi-supervised learning based approach. For example, extraction component 108 can leverage the one or more explicit change-incident linkages described above to discover one or more inexplicit change-incident linkages by: extracting common features between the explicit change-incident linkage(s) and various inexplicit change-incident linkage candidates; determining the linkage strength of each inexplicit change-incident linkage candidate; and filtering out inexplicit change-incident linkage candidates having a defined linkage strength (e.g., a linkage strength below a defined value).

Assessment component 110 can employ a model to assign a change risk assessment score to a defined change in the computing environment based on the change events. For example, assessment component 110 can employ a predictive model that can be trained by trainer component 202 to assign a change risk assessment score to a proposed change in a computing environment as described below using the change event data and/or incidents data described above that can be identified and/or extracted by extraction component 108 from historical operation data of the computing environment. In some embodiments, such a predictive model can comprise an ML and/or AI model that can include, but is not limited to, a forecast model, a classification model, an outliers model, a time series model, a clustering model, and/or another model.

Assessment component 110 can employ a model to assign and/or alter a change risk assessment score based on feedback from an expert entity. For example, assessment component 110 can employ a predictive model defined above to assign and/or alter a change risk assessment score based on feedback from an expert entity that can include, but is not limited to, a human (e.g., an SRE), a computing device, a software application, an expert agent, an ML and/or AI model, and/or another expert entity that can assess and/or verify accuracy of such a change risk assessment score.

In an example, assessment component 110 can employ a predictive model defined above to assign a change risk assessment score to a proposed change in a computing environment and subsequently alter the change risk assessment score based on feedback from such an expert entity (e.g., an SRE). In another example, as described below, assessment component 110 can employ a predictive model defined above that has been trained and/or finetuned (e.g., via dynamic learning, active learning, supervised learning, and/or unsupervised learning) by trainer component 202 based on expert entity feedback corresponding to one or more previously generated change risk assessment scores output by such a model. In this example, assessment component 110 can employ such a predictive model that has been previously trained and/or finetuned (e.g., feature weights of the model have been adjusted) based on expert entity feedback to assign a change risk assessment score to a proposed change in a computing environment. In the above examples, it should be appreciated that assessment component 110 can employ a predictive model defined above to assign or alter a change risk assessment score based on feedback from an expert entity, thereby facilitating: reducing false positive change risk assessment scores output by the predictive model, assessment component 110, and/or change risk assessment system 102; improving accuracy of the change risk assessment score; and/or reducing operational risk associated with one or more computing resources of the computing environment.

As described above, trainer component 202 can train a predictive model defined above to assign a change risk assessment score to a proposed change in a computing environment. To train such a predictive model, trainer component 202 can generate a vectorized model training dataset from a ground truth dataset comprising the above described change events (e.g., change event data (e.g., alphanumeric descriptions) in change tickets) and the one or more incidents (e.g., incident event data (e.g., alphanumeric descriptions) in incident tickets and/or root cause analysis reports describing the incidents) that can be identified and/or extracted by extraction component 108 from the above described historic operational data of the computing environment. To generate such a ground truth dataset, trainer component 202 can use the one or more explicit and/or inexplicit change-incidents linkages described above to tag problematic change events and/or corresponding incidents (e.g., to tag changes that closed as failed or that induced one or more incidents before they were closed).

To generate a vectorized model training dataset from the above described ground truth dataset, trainer component 202 can transform text features (e.g., tokens) in the ground truth dataset to vectors using word embeddings. Trainer component 202 can use the vectorized model training dataset to train a sequence model (e.g., a long short-term memory (LSTM) network, a bidirectional long short-term memory (Bi-LSTM) network, an attention model, and/or another model) to generate return sequences representing time steps corresponding to the vectorized model training dataset and/ or the ground truth dataset. Trainer component 202 can further combine (e.g., concatenate) the return sequences with risk feature data obtained from an expert entity (e.g., an SRE) and/or a deployment topology associated with a defined change (e.g., a proposed change) and/or a computing environment to generate combined vector representations. For example, trainer component 202 can concatenate the risk feature data from an expert entity and/or a deployment topology to the return sequences layer of a sequence model (e.g., LSTM, Bi-LSTM, and/or another model) to generate intermediate vector representations (e.g., the combined vector representations described above). Trainer component 202 can use the above described combined vector representations to train a predictive model defined above to assign a change risk assessment score to a defined change (e.g., a change proposed in a computing environment). In some embodiments, trainer component 202 can use the above described combined vector representations to concurrently train multiple predictive models defined above to assign a change risk assessment score to a defined change (e.g., a change proposed in a computing environment), where trainer component 202 can select the predictive model that performs relatively better than all other predictive models based on hold out set evaluations.

Explanation component 302 can provide an explanation of a change risk assessment score that can be generated by assessment component 110 as described above (e.g., via a trained predictive model). To provide such an explanation of a change risk assessment score, explanation component 302 can identify one or more features in current change data representing a defined change (e.g., a current change ticket describing a proposed change in a computing environment) and can further identify such one or more features in historic change events data representing historic change events. For example, to provide such an explanation of a change risk assessment score, explanation component 302 can identify features (e.g., tokens, words, and/or other features) in a current change ticket (e.g., a newly submitted change ticket) describing a proposed change in a computing environment and can further identify the same features in the above described historic change events data representing historic change events that occurred previously in the same computing environment and/or in another computing environment. In this example, explanation component 302 can further provide weights (e.g., coefficient values ranging between 0.0 and 1.0) corresponding to such features that it can identify in the current change ticket and the historic change events data.

In some embodiments, to provide such an explanation of a change risk assessment score, explanation component 302 can employ one or more model explainability techniques to derive features that explain the change risk assessment score. For example, to provide such an explanation of a change risk assessment score, explanation component 302 can employ a model explainability algorithm that identifies, in the above described current change ticket and the historic change events data, the features (e.g., tokens, words, and/or other features) having the most impact on a certain change risk assessment score. In this example, such features having the most impact can be determined (e.g., by the algorithm and/or explanation component 302) based on the weights corresponding to the features, where the higher the weight value is, for instance, the greater the affect it has on the change risk assessment score.

In the example embodiments described above, it should be appreciated that explanation component 302 can generate such an explanation of a change risk assessment score by using the identified features described above to extract historic evidence of changes (e.g., historic change tickets, historic incident tickets, historic root cause analysis reports, and/or other historic evidence) that contain such features and that were problematic (e.g., that failed or induced incidents). In these example embodiments, explanation component 302 can provide such historic evidence of changes to support (e.g., explain) a change risk assessment score.

FIG. 4 illustrates a block diagram of an example, non-limiting system 400 that can facilitate proactive operational risk assessment of a proposed change in a computing environment in accordance with one or more embodiments described herein. Repetitive description of like elements and/or processes employed in respective embodiments is omitted for sake of brevity.

As illustrated in the example embodiment depicted in FIG. 4, change risk assessment system 102 can receive historic change data 402a (e.g., historic change tickets), historic incidents data 402b (e.g., historic incident tickets), historic root cause analysis data 402c (e.g., historic root cause analysis reports), deployment topology 402d, and/or entity input 402e (e.g., expert entity input from, for instance, an SRE). For example, in some embodiments, change risk assessment system 102 can comprise an interface component (not illustrated in FIG. 4) such as, for instance, a graphical user interface (GUI), an application programming interface (API), a representational state transfer API (REST API), and/or another interface component that can enable change risk assessment system 102, and/or one or more components thereof, to receive such inputs described above and illustrated in FIG. 4.

In the example embodiment illustrated in FIG. 4, change risk assessment system 102 can employ extraction component 108 to identify problematic changes 404. For example, with reference to the example embodiments described above and depicted in FIGS. 1, 2, and 3, extraction component 108 can identify and/or extract explicit and/or inexplicit change-incident linkages from historic change data 402a, historic incidents data 402b, and/or historic root cause analysis data 402c (e.g., where such inputs can collectively constitute historic operational data of a computing environment).

In the example embodiment illustrated in FIG. 4, based on identifying problematic changes 404 (e.g., via identifying and/or extracting such explicit and/or inexplicit change-incident linkages), change risk assessment system 102 can employ trainer component 202 to generate model training data 406 using such identified problematic changes 404. For example, with reference to the example embodiments described above and depicted in FIGS. 1, 2, and 3, change risk assessment system 102 can employ trainer component 202 to generate a ground truth dataset comprising such identified problematic changes 404. In this example, with reference to the example embodiments described above and depicted in FIGS. 1, 2, and 3, trainer component 202 can further generate a vectorized model training dataset from such a ground truth dataset (e.g., trainer component 202 can generate a vectorized representation of the ground truth dataset). In this example, such a ground truth dataset and/or vectorized model training dataset can constitute such generated model training data 406.

In the example embodiment depicted in FIG. 4, change risk assessment system 102 can further employ trainer component 202 to train a sequential model 408 (e.g., LSTM, Bi-LSTM, and/or another model) using such generated model training data 406 described above. For example, with reference to the example embodiments described above and depicted in FIGS. 1, 2, and 3, trainer component 202 can train a sequential model 408 to generate return sequences representing time steps corresponding to generated model training data 406 described above (e.g., corresponding to the above described vectorized model training dataset and/or the ground truth dataset). In this example, trainer component 202 can further combine (e.g., concatenate) the return sequences with deployment topology 402d and/or entity input 402e (e.g., where each of such inputs represents additional risk feature data) to generate combined vector representations. In the example embodiment depicted in FIG. 4, trainer component 202 can use such combined vector representations to train a predictive model 410 (e.g., a forecast model, a classification model, an outliers model, a time series model, a clustering model, and/or another model) to assign a change risk assessment score to a defined change (e.g., a change proposed in a computing environment).

In the example embodiment illustrated in FIG. 4, at runtime, for example, change risk assessment system 102 and/or trainer component 202 can receive a proposed change 412 (e.g., a change proposed in a computing environment). In this example embodiment, with reference to the example embodiments described above and depicted in FIGS. 1, 2, and 3, change risk assessment system 102 and/or assessment component 110 can employ such a trained predictive model 410 to assign a change risk assessment score 414 to such a proposed change 412. In this example embodiment, with reference to the example embodiments described above and depicted in FIGS. 1, 2, and 3, change risk assessment system 102 can employ explanation component 302 to provide a risk explanation 416 corresponding to change risk assessment score 414. In this example embodiment, risk explanation 416 can comprise features (e.g., words, tokens, and/or other features) and/or corresponding weights identified by explanation component 302 in proposed change 412 and historic change data 402a, historic incidents data 402b, and/or historic root cause analysis data 402c. In this example embodiment, explanation component 302 can generate risk explanation 416 by using the identified features described above to extract historic evidence of changes (e.g., historic change ticket, incident ticket, and/or root cause analysis report) from historic change data 402a, historic incidents data 402b, and/or historic root cause analysis data 402c, where such historic evidence of changes contain such features and were problematic (e.g., they failed or induced incidents). In this example embodiment, explanation component 302 can provide such historic evidence of changes to support (e.g., explain) change risk assessment score 414.

In the example embodiment depicted in FIG. 4, change risk assessment system 102 and/or assessment component 110 can provide (e.g., via a GUI, an API, a REST API, and/or another interface component of change risk assessment system 102) change risk assessment score 414 and/or risk explanation 416 to an expert entity 418. Expert entity 418 can comprise, for example, a human (e.g., an SRE), a computing device, a software application, an expert agent, an ML and/or AI model, and/or another expert entity that can assess and/or verify accuracy of change risk assessment score 414 and/or risk explanation 416. In some embodiments, expert entity 418 can assess and/or verify accuracy of change risk assessment score 414 and/or risk explanation 416 based on historical data including, but not limited to, human experience (e.g., experience of a human expert), historic change data, historic incident data, historic root cause analysis data, historic analytics data and/or simulation data corresponding to one or more computing environments and/or resource(s) thereof, historic training data, historic ground truth data, and/or other historical data.

In this example embodiment, based on expert entity 418 review of change risk assessment score 414 and/or risk explanation 416, expert entity 418 can provide expert entity feedback 420 to change risk assessment system 102 and/or trainer component 202 (e.g., via a GUI, an API, a REST API, and/or another interface component of change risk assessment system 102). In this example embodiment, based on receiving expert entity feedback 420, change risk assessment system 102 can employ trainer component 202 to finetune predictive model 410. For example, trainer component 202 can finetune predictive model 410 by modifying one or more features and/or corresponding weights used by predictive model 410 to generate change risk assessment scores.

Figure 5:
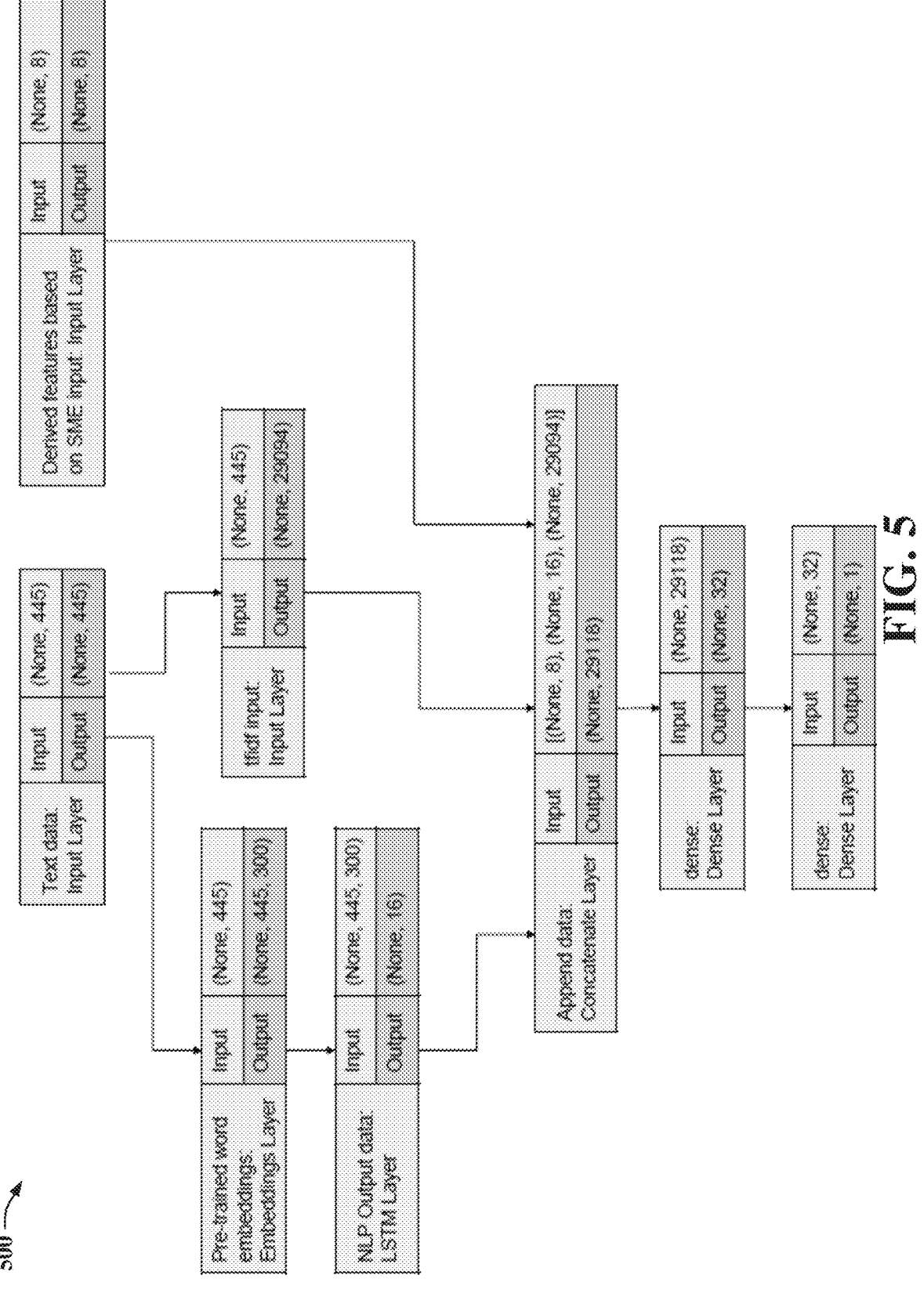
FIG. 5 illustrates an example, non-limiting diagram that can facilitate proactive operational risk assessment of a proposed change in a computing environment in accordance with one or more embodiments described herein.

FIG. 5 illustrates an example, non-limiting diagram 500 that can facilitate proactive operational risk assessment of a proposed change in a computing environment in accordance with one or more embodiments described herein. Repetitive description of like elements and/or processes employed in respective embodiments is omitted for sake of brevity.

Diagram 500 can comprise an example, non-limiting embodiment of a model training pipeline that can be employed by change risk assessment system 102 and/or one or more components thereof (e.g., trainer component 202) to train a predictive model described herein using a sequential model (e.g., LSTM, Bi-LSTM, and/or another sequential model) in accordance with one or more embodiments of the subject disclosure. For example, with reference to the example embodiment described above and illustrated in FIG. 4, diagram 500 can comprise an example, non-limiting embodiment of a model training pipeline that can be employed by change risk assessment system 102 and/or trainer component 202 to train predictive model 410 using sequential model 408. The text abbreviations annotated in diagram 500 depicted in FIG. 5 are defined as follows.

SME: subject matter expert (e.g., expert entity 418).

tfidf: term frequency-inverse document frequency.

NLP: natural language processing.

Figure 6:
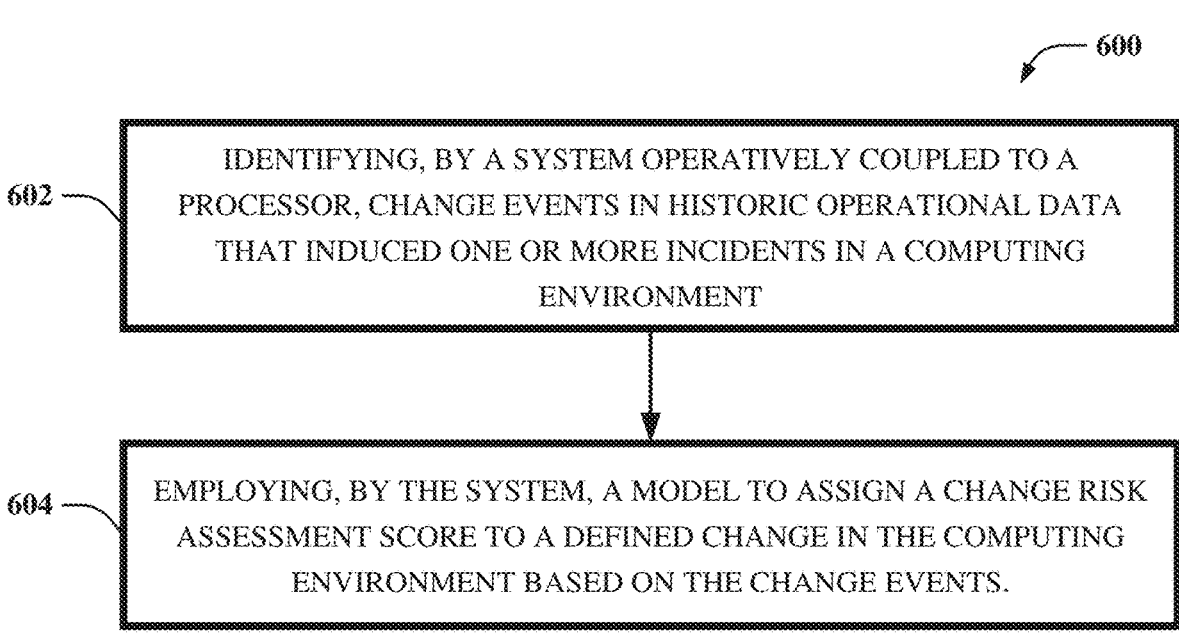

FIG. 6 illustrates a flow diagram of an example, non-limiting computer-implemented method 600 that can facilitate proactive operational risk assessment of a proposed change in a computing environment in accordance with one or more embodiments described herein. Repetitive description of like elements and/or processes employed in respective embodiments is omitted for sake of brevity.

At 602, computer-implemented method 600 can comprise identifying, by a system (e.g., via change risk assessment system 102 and/or extraction component 108) operatively coupled to a processor (e.g., processor 106), change events (e.g., source code changes, configuration changes, environment changes, outdated security changes, and/or another change event) in historic operational data (e.g., change tickets, root cause analysis reports, incident tickets, resolution data, SRE dialogue data, logs, and/or other data) that induced one or more incidents (e.g., resource and/or service interruption, failure, delay, and/or damage) in a computing environment (e.g., a classical based, cloud based, or quantum based computing environment).

At 604, computer-implemented method 600 can comprise employing, by the system (e.g., via change risk assessment system 102 and/or assessment component 110), a model (e.g., a predictive model such as, for instance, a forecast model, a classification model, an outliers model, a time series model, a clustering model, and/or another model) to assign a change risk assessment score (e.g., change risk assessment score 414) to a defined change (e.g., proposed change 412) in the computing environment based on the change events.

FIG. 7 illustrates a flow diagram of an example, non-limiting computer-implemented method 700 that can facilitate proactive operational risk assessment of a proposed change in a computing environment in accordance with one or more embodiments described herein. Repetitive description of like elements and/or processes employed in respective embodiments is omitted for sake of brevity.

At 702, computer-implemented method 700 can comprise employing, by a system (e.g., via change risk assessment system 102 and/or assessment component 110) operatively coupled to a processor (e.g., processor 106), a model (e.g., a predictive model such as, for instance, a forecast model, a classification model, an outliers model, a time series model, a clustering model, and/or another model) to assign a change risk assessment score (e.g., change risk assessment score 414) to a defined change (e.g., proposed change 412) in a computing environment (e.g., resource and/or service interruption, failure, delay, and/or damage) based on change events (e.g., source code changes, configuration changes, environment changes, outdated security changes, and/or another change event) that induced one or more incidents (e.g., resource and/or service interruption, failure, delay, and/or damage) in the computing environment.

At 704, computer-implemented method 700 can comprise providing, by the system (e.g., via change risk assessment system 102 and/or explanation component 302), an explanation (e.g., risk explanation 416) of the change risk assessment score using change data (e.g., text data, numeric data, alphanumeric data, and/or other data) that represents at least one of the change events and that has one or more features of the defined change.

Change risk assessment system 102 can be associated with various technologies. For example, change risk assessment system 102 can be associated with computing environment technologies, operational risk assessment technologies, ML and/or AI model technologies, cloud computing technologies, and/or other technologies.

Change risk assessment system 102 can provide technical improvements to systems, devices, components, operational steps, and/or processing steps associated with the various technologies identified above. For example, change risk assessment system 102 can proactively assess operational risk of a proposed change in a computing environment based on historic operational data prior to implementation of the proposed change. In this example, change risk assessment system 102 can further provide a change risk assessment score corresponding to the proposed change and a risk explanation of the assessment that supports the change risk assessment score. In this example, such a risk explanation can comprise historic evidence of at least one historic change that has one or more features of the proposed change, which can enable an entity (e.g., an SRE) to reduce operational risk of one or more computing resources in the computing environment. In another example, change risk assessment system 102 can assign and/or alter the change risk assessment score based on feedback from an expert entity, thereby facilitating reduced false positive change risk assessment scores output by change risk assessment system 102 and/or improved accuracy of the change risk assessment score, which can further enable an entity such as, for instance, an SRE to reduce operational risk associated with one or more computing resources of the computing environment.

Change risk assessment system 102 can provide technical improvements to a processing unit associated with change risk assessment system 102. For example, as described above, such a risk explanation that can be generated by change risk assessment system 102 can comprise historic evidence of at least one historic change that has one or more features of the proposed change, which can enable an entity (e.g., an SRE) to reduce operational risk of one or more computing resources in the computing environment. In this example, such one or more computing resources can comprise a processing unit (e.g., a processor) and based on such a risk explanation, such an entity can identify potential incident(s) that can potentially: reduce the performance and/or efficiency of the processing unit; cause damage to the processing unit; interrupt operation of the processing unit; and/or cause the processing unit to malfunction.

A practical application of change risk assessment system 102 is that it can be implemented in a computing environment to assess operational risk associated with changes in the computing environment. For example, a practical application of change risk assessment system 102 is that it can be implemented to proactively assess operational risk associated with a certain proposed change in a classical based, cloud based, and/or quantum based computing environment before the proposed change is implemented to identify potential incidents that can result from the proposed change.

It should be appreciated that change risk assessment system 102 provides a new approach driven by relatively new operational risk assessment technologies. For example, change risk assessment system 102 provides a new approach to proactively assess operational risk associated with a proposed change in a classical based, cloud based, and/or quantum based computing environment before the proposed change is implemented.

Change risk assessment system 102 can employ hardware or software to solve problems that are highly technical in nature, that are not abstract and that cannot be performed as a set of mental acts by a human. In some embodiments, one or more of the processes described herein can be performed by one or more specialized computers (e.g., a specialized processing unit, a specialized classical computer, a specialized quantum computer, and/or another type of specialized computer) to execute defined tasks related to the various technologies identified above. Change risk assessment system 102 and/or components thereof, can be employed to solve new problems that arise through advancements in technologies mentioned above, employment of quantum computing systems, cloud computing systems, computer architecture, and/or another technology.

It is to be appreciated that change risk assessment system 102 can utilize various combinations of electrical components, mechanical components, and circuitry that cannot be replicated in the mind of a human or performed by a human, as the various operations that can be executed by change risk assessment system 102 and/or components thereof as described herein are operations that are greater than the capability of a human mind. For instance, the amount of data processed, the speed of processing such data, or the types of data processed by change risk assessment system 102 over a certain period of time can be greater, faster, or different than the amount, speed, or data type that can be processed by a human mind over the same period of time.

According to several embodiments, change risk assessment system 102 can also be fully operational towards performing one or more other functions (e.g., fully powered on, fully executed, and/or another function) while also performing the various operations described herein. It should be appreciated that such simultaneous multi-operational execution is beyond the capability of a human mind. It should also be appreciated that change risk assessment system 102 can include information that is impossible to obtain manually by an entity, such as a human user. For example, the type, amount, and/or variety of information included in change risk assessment system 102, extraction component 108, assessment component 110, trainer component 202, and/or explanation component 302 can be more complex than information obtained manually by an entity, such as a human user.

In some embodiments, change risk assessment system 102 can be associated with a cloud computing environment. For example, change risk assessment system 102 can be associated with cloud computing environment 950 described below with reference to FIG. 9 and/or one or more functional abstraction layers described below with reference to FIG. 10 (e.g., hardware and software layer 1060, virtualization layer 1070, management layer 1080, and/or workloads layer 1090).

Change risk assessment system 102 and/or components thereof (e.g., extraction component 108, assessment component 110, trainer component 202, explanation component 302, and/or another component) can employ one or more computing resources of cloud computing environment 950 described below with reference to FIG. 9 and/or one or more functional abstraction layers described below with reference to FIG. 10 to execute one or more operations in accordance with one or more embodiments of the subject disclosure described herein. For example, cloud computing environment 950 and/or such one or more functional abstraction layers can comprise one or more classical computing devices (e.g., classical computer, classical processor, virtual machine, server, and/or another classical computing device), quantum hardware, and/or quantum software (e.g., quantum computing device, quantum computer, quantum processor, quantum circuit simulation software, superconducting circuit, and/or other quantum hardware and/or quantum software) that can be employed by change risk assessment system 102 and/or components thereof to execute one or more operations in accordance with one or more embodiments of the subject disclosure described herein. For instance, change risk assessment system 102 and/or components thereof can employ such one or more classical and/or quantum computing resources to execute one or more classical and/or quantum: mathematical function, calculation, and/or equation; computing and/or processing script, processing thread, and/or instruction; algorithm; model (e.g., AI model, ML model, and/or another type of model); and/or another operation in accordance with one or more embodiments of the subject disclosure described herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 8:
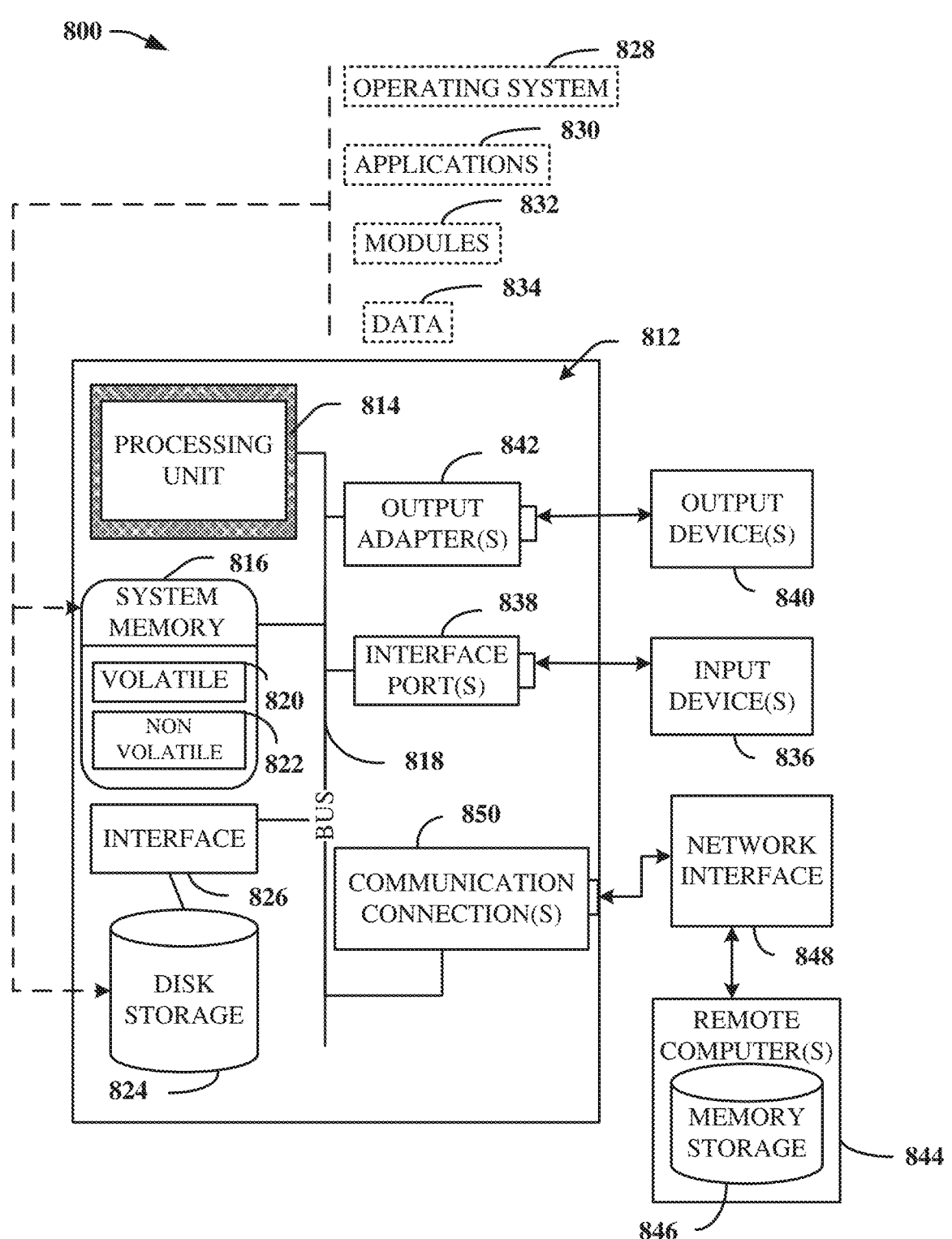
FIG. 8 illustrates a block diagram of an example, non-limiting operating environment in which one or more embodiments described herein can be facilitated.

In order to provide a context for the various aspects of the disclosed subject matter, FIG. 8 as well as the following discussion are intended to provide a general description of a suitable environment in which the various aspects of the disclosed subject matter can be implemented. FIG. 8 illustrates a block diagram of an example, non-limiting operating environment in which one or more embodiments described herein can be facilitated. Repetitive description of like elements employed in other embodiments described herein is omitted for sake of brevity.

With reference to FIG. 8, a suitable operating environment 800 for implementing various aspects of this disclosure can also include a computer 812. The computer 812 can also include a processing unit 814, a system memory 816, and a system bus 818. The system bus 818 couples system components including, but not limited to, the system memory 816 to the processing unit 814. The processing unit 814 can be any of various available processors. Dual microprocessors and other multiprocessor architectures also can be employed as the processing unit 814. The system bus 818 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 816 can also include volatile memory 820 and nonvolatile memory 822. The basic input/output system (BIOS), containing the basic routines to transfer information between elements within the computer 812, such as during start-up, is stored in nonvolatile memory 822. Computer 812 can also include removable/non-removable, volatile/non-volatile computer storage media. FIG. 8 illustrates, for example, a disk storage 824. Disk storage 824 can also include, but is not limited to, devices like a magnetic disk drive, floppy disk drive, tape drive, Jaz drive, Zip drive, LS-100 drive, flash memory card, or memory stick. The disk storage 824 also can include storage media separately or in combination with other storage media. To facilitate connection of the disk storage 824 to the system bus 818, a removable or non-removable interface is typically used, such as interface 826. FIG. 8 also depicts software that acts as an intermediary between users and the basic computer resources described in the suitable operating environment 800. Such software can also include, for example, an operating system 828. Operating system 828, which can be stored on disk storage 824, acts to control and allocate resources of the computer 812.

System applications 830 take advantage of the management of resources by operating system 828 through program modules 832 and program data 834, e.g., stored either in system memory 816 or on disk storage 824. It is to be appreciated that this disclosure can be implemented with various operating systems or combinations of operating systems. A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port can be used to provide input to computer 812, and to output information from computer 812 to an output device 840. Output adapter 842 is provided to illustrate that there are some output devices 840 like monitors, speakers, and printers, among other output devices 840, which require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a computer, a server, a router, a network PC, a workstation, a microprocessor based appliance, a peer device or other common network node and the like, and typically can also include many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses wire and/or wireless communication networks such as local-area networks (LAN), wide-area networks (WAN), cellular networks, and/or another wire and/or wireless communication network. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 850 refers to the hardware/software employed to connect the network interface 848 to the system bus 818. While communication connection 850 is shown for illustrative clarity inside computer 812, it can also be external to computer 812. The hardware/software for connection to the network interface 848 can also include, for exemplary purposes only, internal and external technologies such as, modems including regular telephone grade modems, cable modems and DSL modems, ISDN adapters, and Ethernet cards.

Figure 9:
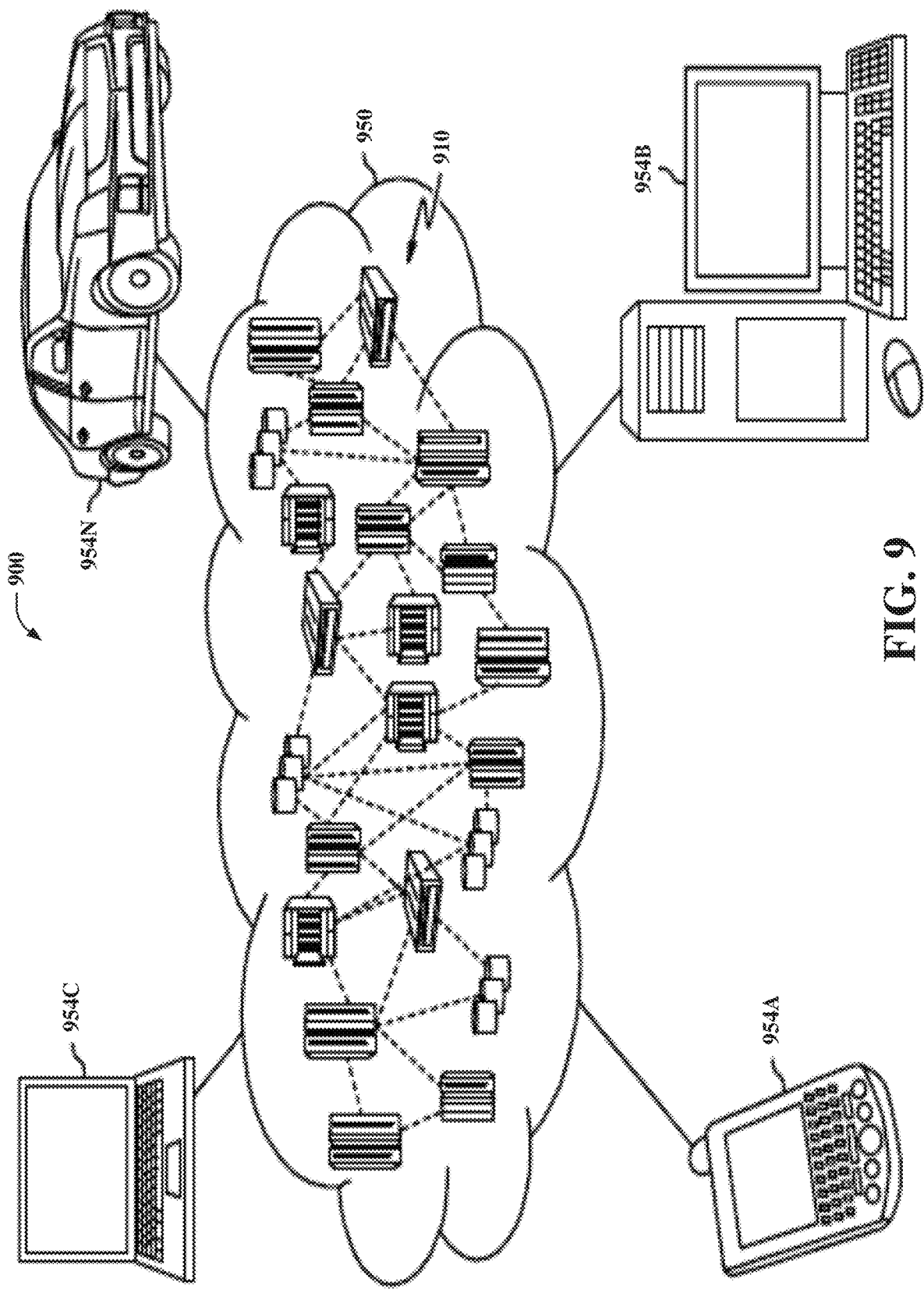
FIG. 9 illustrates a block diagram of an example, non-limiting cloud computing environment in accordance with one or more embodiments of the subject disclosure.

Referring now to FIG. 9, an illustrative cloud computing environment 950 is depicted. As shown, cloud computing environment 950 includes one or more cloud computing nodes 910 with which local computing devices used by cloud consumers, such as, for example, personal digital assistant (PDA) or cellular telephone 954A, desktop computer 954B, laptop computer 954C, and/or automobile computer system 954N may communicate. Although not illustrated in FIG. 9, cloud computing nodes 910 can further comprise a quantum platform (e.g., quantum computer, quantum hardware, quantum software, and/or another quantum platform) with which local computing devices used by cloud consumers can communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 910 and cloud computing environment 950 can communicate with any type of computerized device over any type of network and/or network addressable connection (e.g., using a web browser).

Figure 10:
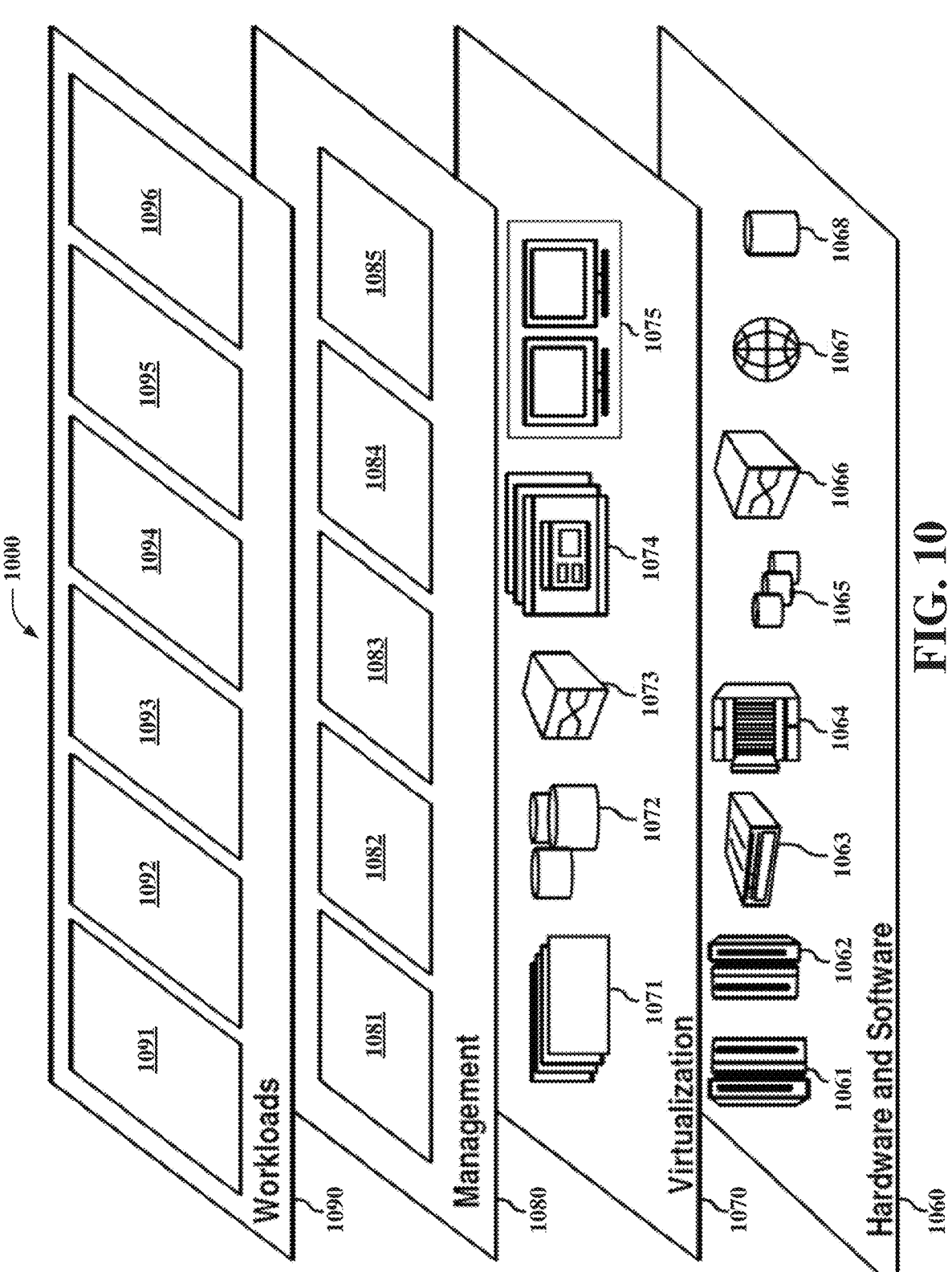
FIG. 10 illustrates a block diagram of example, non-limiting abstraction model layers in accordance with one or more embodiments of the subject disclosure.

Referring now to FIG. 10, a set of functional abstraction layers provided by cloud computing environment 950 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067, database software 1068, quantum platform routing software (not illustrated in FIG. 10), and/or quantum software (not illustrated in FIG. 10).

Virtualization layer 1070 provides an abstraction layer from which the following examples of virtual entities may be provided: virtual servers 1071; virtual storage 1072;

virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and pricing 1082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Non-limiting examples of workloads and functions which may be provided from this layer include: mapping and navigation 1091; software development and lifecycle management 1092; virtual classroom education delivery 1093; data analytics processing 1094; transaction processing 1095; and change risk assessment software 1096.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, and/or other program modules that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices. For example, in one or more embodiments, computer executable components can be executed from memory that can include or be comprised of one or more distributed memory units. As used herein, the term "memory" and "memory unit" are interchangeable. Further, one or more embodiments described herein can execute code of the computer executable components in a distributed manner, e.g., multiple processors combining or working cooperatively to execute code from one or more distributed memory units. As used herein, the term "memory" can encompass a single memory or memory unit at one location or multiple memories or memory units at one or more locations.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, where the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DR-RAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:

a processor that executes computer executable components stored in memory, the computer executable components comprising:

an extraction component that identifies change events in historic operational data that induced one or more incidents in a computing environment;

a trainer component that concurrently trains a plurality of predictive models based on steps comprising:

generating a vectorized model training dataset from a ground truth dataset comprising the change events and the one or more incidents, wherein the generation of the vectorized model training data from the ground truth dataset comprises transformation of text features in the ground truth dataset to vectors using word embeddings;

using one or more explicit or inexplicit change-incidents linkages to tag problematic change events or corresponding incidents to tag changes that closed as failed or that induced one or more incidents before they were closed;

training a sequence model employing the vectorized model training dataset;

generating return sequences representing time steps corresponding to the vectorized model training dataset and the ground truth dataset;

concatenating risk feature data to a return sequence layer of a sequence model to generate combined vector representations;

concurrently training multiple ones of the plurality of predictive models via employing the combined vector representations; and assigning a change risk assessment score to a defined change, wherein the defined change is a change proposed in a computing environment; and selecting a predictive model of the plurality of predictive models that performs relatively better than others of the plurality of predictive models based on hold out set evaluations, wherein the plurality of predictive models comprise a machine learning or artificial intelligence model that includes a forecast model, a classification model, an outliers model, a time series model or a clustering model;

an assessment component that:

provides the change risk assessment score to an expert entity to verify accuracy of the change risk assessment score; and employs, based on receiving expert entity feedback, the trainer component to finetune the selected predictive model by modifying one or more features or corresponding weights used by the selected predictive model; and explanation component that employs one or more model explainability techniques to derive features that explain the change risk assessment score and provides the change risk assessment score generated by the assessment component.

2. The system of claim 1, wherein the risk feature data is obtained from at least one of an expert entity or a deployment topology associated with the defined change or the computing environment to generate combined vector representations.

3. The system of claim 1, wherein the explanation component also identifies features in change data representing the defined change and further identifies the features in change events data representing the change events to explain the change risk assessment score.

4. The system of claim 1, wherein the assessment component employs the model to assign or alter the change risk assessment score based on the feedback from the expert entity, thereby reducing false positive change risk assessment scores output by the system, improving accuracy of the change risk assessment score, or reducing operational risk associated with one or more computing resources of the computing environment.

5. A computer-implemented method, comprising:

identifying, by a system operatively coupled to a processor, change events in historic operational data that induced one or more incidents in a computing environment;

concurrently training a plurality of predictive models based on steps comprising:

generating a vectorized model training dataset from a ground truth dataset comprising the change events and the one or more incidents, wherein the generation of the vectorized model training data from the ground truth dataset comprises transformation of text features in the ground truth dataset to vectors using word embeddings;

using one or more explicit or inexplicit change-incidents linkages to tag problematic change events or corresponding incidents to tag changes that closed as failed or that induced one or more incidents before they were closed;

training a sequence model employing the vectorized model training dataset;

generating return sequences representing time steps corresponding to the vectorized model training dataset and the ground truth dataset;

concatenating risk feature data to a return sequence layer of a sequence model to generate combined vector representations;

concurrently training the plurality of predictive models via employing the combined vector representations; and assigning a change risk assessment score to a defined change, wherein the defined change is a change proposed in a computing environment;

selecting, by the system, a predictive model of the plurality of predictive models that performs relatively better than others of the plurality of predictive models based on hold out set evaluations, wherein the plurality of predictive models comprise a machine learning or artificial intelligence model that includes a forecast model, a classification model, an outliers model, a time series model or a clustering model;

providing, by the system, the change risk assessment score to an expert entity to verify accuracy of the change risk assessment score;

employing, by the system, based on receiving expert entity feedback, the trainer component to finetune the selected predictive model by modifying one or more features or corresponding weights used by the selected predictive model; and employing, by the system, one or more model explainability techniques to derive features that explain the change risk assessment score and provides the change risk assessment score generated by the assessment component.

6. The computer-implemented method of claim 5, wherein the return sequences with risk feature data is obtained from at least one of the expert entity or a deployment topology associated with the defined change or the computing environment to generate the combined vector representations.

7. The computer-implemented method of claim 5, further comprising:

identifying, by the system, features in change data representing the defined change; and identifying, by the system, the features in change events data representing the change events to explain the change risk assessment score.

8. The computer-implemented method of claim 5, further comprising:

employing, by the system, the plurality of predictive models to assign or alter the change risk assessment score based on the feedback from the expert entity, thereby reducing false positive change risk assessment scores output by the system, improving accuracy of the change risk assessment score, or reducing operational risk associated with one or more computing resources of the computing environment.

9. A computer program product comprising a computer readable storage medium having program instructions embodied therewith, the program instructions executable by a processor to cause the processor to:

concurrently train a plurality of predictive models based on steps comprising:

generation of a vectorized model training dataset from a ground truth dataset comprising the change events and the one or more incidents, wherein the generation of the vectorized model training data from the ground truth dataset comprises transformation of text features in the ground truth dataset to vectors using word embeddings;

a using of one or more explicit or inexplicit change-incidents linkages to tag problematic change events or corresponding incidents to tag changes that closed as failed or that induced one or more incidents before they were closed;

a training of a sequence model employing the vectorized model training dataset;

generation of return sequences representing time steps corresponding to the vectorized model training dataset and the ground truth dataset;

concatenation of risk feature data to a return sequence layer of a sequence model to generate combined vector representations;

a concurrently training of the plurality of predictive models via employing the combined vector representations; and assignment of a change risk assessment score to a defined change, wherein the defined change is a change proposed in a computing environment;

select a predictive model of the plurality of predictive models that performs relatively better than others of the plurality of predictive models based on hold out set evaluations, wherein the plurality of predictive models comprise a machine learning or artificial intelligence model that includes a forecast model, a classification model, an outliers model, a time series model or a clustering model;

provide the change risk assessment score to an expert entity to verify accuracy of the change risk assessment score;

employ based on receiving expert entity feedback, the trainer component to finetune the selected predictive model by modifying one or more features or corresponding weights used by the selected predictive model; and employ one or more model explainability techniques to derive features that explain the change risk assessment score and provides the change risk assessment score generated by the assessment component.

10. The computer program product of claim 9, wherein the program instructions are further executable by the processor to cause the processor to:

generate a vectorized model training dataset from a ground truth dataset comprising the change events and the one or more incidents; and train, using the vectorized model training dataset, a sequence model to generate return sequences representing time steps corresponding to the vectorized model training dataset.

11. The computer program product of claim 10, wherein the program instructions are further executable by the processor to cause the processor to:

combine the return sequences with risk feature data obtained from at least one of the expert entity or a deployment topology associated with the defined change or the computing environment to generate combined vector representations; and train, using the combined vector representations, the model to assign the change risk assessment score to the defined change.

12. The computer program product of claim 9, wherein the program instructions are further executable by the processor to cause the processor to:

identify features in change data representing the defined change; and identify the features in change events data representing the change events to explain the change risk assessment score.

13. The computer program product of claim 9, wherein the program instructions are further executable by the processor to cause the processor to:

employ the model to assign or alter the change risk assessment score based on the feedback from the expert entity, thereby reducing false positive change risk assessment scores output by the processor, improving accuracy of the change risk assessment score, or reducing operational risk associated with one or more computing resources of the computing environment.

14. A system, comprising:

a processor that executes computer executable components stored in memory, the computer executable components comprising:

a trainer component that concurrently trains a plurality of predictive models based on steps comprising:

generating a vectorized model training dataset from a ground truth dataset comprising the change events and the one or more incidents, wherein the generation of the vectorized model training data from the ground truth dataset comprises transformation of text features in the ground truth dataset to vectors using word embeddings;

using one or more explicit or inexplicit change-incidents linkages to tag problematic change events or corresponding incidents to tag changes that closed as failed or that induced one or more incidents before they were closed;

training a sequence model employing the vectorized model training dataset;

generating return sequences representing time steps corresponding to the vectorized model training dataset and the ground truth dataset;

concatenating risk feature data to a return sequence layer of a sequence model to generate combined vector representations;

concurrently training the plurality of predictive models via employing the combined vector representations; and assigning a change risk assessment score to a defined change, wherein the defined change is a change proposed in a computing environment; and an assessment component that:

provides the change risk assessment score to an expert entity to verify accuracy of the change risk assessment score; and employs, based on receiving expert entity feedback, the trainer component to finetune the selected predictive model by modifying one or more features or corresponding weights used by the selected predictive model; and an explanation component that:

displays, via a graphical user interface (GUI), over the Internet, an explanation of the change risk assessment score using change data that represents at least one of the change events and that has one or more features of the defined change; and employs one or more model explainability techniques to derive features that explain the change risk assessment score and provides the change risk assessment score generated by the assessment component, wherein the GUI is located at a first location distinct from a second location of the computing environment, wherein the plurality of predictive models comprise a machine learning or artificial intelligence model that includes a forecast model, a classification model, an outliers model, a time series model or a clustering model.

15. The system of claim 14, wherein the computer executable components further comprise:

an extraction component that identifies at least one of the change events or the one or more incidents in historic operational data of the computing environment.

16. The system of claim 14, wherein the trainer component combines the return sequences with risk feature data obtained from at least one of the expert entity or a deployment topology associated with the defined change or the computing environment to generate the combined vector representations, and wherein the trainer component further uses the combined vector representations to train the predictive model to assign the change risk assessment score to the defined change.

17. The system of claim 14, wherein the assessment component employs the predictive model to assign or alter the change risk assessment score based on feedback from the expert entity, thereby reducing false positive change risk assessment scores output by the system, improving accuracy of the change risk assessment score, or reducing operational risk associated with one or more computing resources of the computing environment.

18. A computer-implemented method, comprising:

generating, by a system operatively coupled to a processor, vectorized model training dataset from a ground truth dataset comprising change events and one or more incidents;

concurrently training a plurality of predictive models based on steps comprising:

generating a vectorized model training dataset from a ground truth dataset comprising the change events and the one or more incidents, wherein the generation of the vectorized model training data from the ground truth dataset comprises transformation of text features in the ground truth dataset to vectors using word embeddings;

using one or more explicit or inexplicit change-incidents linkages to tag problematic change events or corresponding incidents to tag changes that closed as failed or that induced one or more incidents before they were closed;

training a sequence model employing the vectorized model training dataset;

generating return sequences representing time steps corresponding to the vectorized model training dataset and the ground truth dataset;

concatenating risk feature data to a return sequence layer of a sequence model to generate combined vector representations;

concurrently training the plurality of predictive models via employing the combined vector representations; and assigning a change risk assessment score to a defined change, wherein the defined change is a change proposed in a computing environment;

providing, by the system, the change risk assessment score to an expert entity to verify accuracy of the change risk assessment score;

employing, by the system, based on receiving expert entity feedback, the trainer component to finetune the selected predictive model by modifying one or more features or corresponding weights used by the selected predictive model; and displaying, by the system, via an application programming interface, an explanation of the change risk assessment score using change data associated with a change in source code or configuration changes and that represents at least one of the change events and that has one or more features of the defined change, employing, by the system, one or more model explainability techniques to derive features that explain the change risk assessment score and provides the change risk assessment score generated by the assessment component, wherein the plurality of predictive models comprise a machine learning or artificial intelligence model that includes a forecast model, a classification model, an outliers model, a time series model or a clustering model.

19. The computer-implemented method of claim 18, further comprising:

identifying, by the system, at least one of the change events or the one or more incidents in historic operational data of the computing environment.

20. The computer-implemented method of claim 18, further comprising:

combining, by the system, the return sequences with risk feature data obtained from at least one of expert entity or a deployment topology associated with the defined change or the computing environment to generate combined vector representations.

21. The computer-implemented method of claim 18, further comprising:

employing, by the system, the predictive model to assign or alter the change risk assessment score based on feedback from an expert entity, thereby reducing false positive change risk assessment scores output by the system, improving accuracy of the change risk assessment score, or reducing operational risk associated with one or more computing resources of the computing environment.

\* \* \* \* \*